(12) United States Patent
Gallup et al.

(10) Patent No.: US 6,616,341 B2
(45) Date of Patent: Sep. 9, 2003

(54) METHOD AND APPARATUS FOR ALIGNING GUIDE PINS WITH A CONNECTOR GUIDE

(75) Inventors: Kendra Gallup, Sunnyvale, CA (US); Brian H. Kim, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/955,824

(22) Filed: Sep. 18, 2001

(65) Prior Publication Data

US 2003/0053759 A1 Mar. 20, 2003

(51) Int. Cl.[7] ................................................. G02B 6/36
(52) U.S. Cl. ............................... 385/53; 385/59; 385/83
(58) Field of Search .............................. 385/53, 59, 83, 385/60, 65, 61, 78

(56) References Cited

U.S. PATENT DOCUMENTS 5,044,720 A * 9/1991 Haley et al. ................... 385/88
6,340,247 B1 * 1/2002 Sakurai et al. ................. 385/78

* cited by examiner

*Primary Examiner*—Phan T. H. Palmer

(57) ABSTRACT

A method and apparatus for ensuring that two guide pins with a centerline in a module (e.g., a fiber optic module) mate with two holes in a connector. A connector guide positioner is provided to position a connector guide in an aligned orientation with respect to the guide pins. When in the aligned orientation, the centerline of the connector guide is in alignment with the centerline of the two guide pins of the module, thereby ensuring that the two holes of the connector mate with the two guide pins when the connector is inserted into the receptacle.

20 Claims, 5 Drawing Sheets

METHOD AND APPARATUS FOR ALIGNING GUIDE PINS WITH A CONNECTOR GUIDE

FIELD OF THE INVENTION

The present invention relates generally to the manufacture of fiber optic modules, and more particularly, to a method and apparatus for aligning guide pins with a connector guide.

BACKGROUND OF THE INVENTION

With the growth of computer networks (e.g., the Internet and the World Wide Web), the demand for network devices that form these networks is also rapidly increasing. A measure of performance of these network devices is the rate or speed at which the devices transfer data. As the information that needs to be transferred across the network becomes more voluminous and complex (e.g., the distribution of audio files, video files, and software programs over the network), networking companies are constantly challenged to design and manufacture networking products (e.g., switches and routers) that push the envelope in terms of the speed at which these products transfer data.

One way to enhance the speed of distributing data across a network is to utilize light to carry information and to use fiber optics as a transport mechanism. One advantage of using fiber optics is that a greater volume of data can be transferred at higher speeds via fiber optic cables as compared to electrical wires. However, signals are typically generated by a digital system (e.g., a web browser program executing on a computer) in an electrical format. Consequently, one important component in these networking devices is an optical module for converting electrical signals into optical signals and vice versa.

Examples of optical modules are optical receivers, optical transmitters, and optical transceivers. An optical receiver is a circuit that receives light signals from an optical medium (e.g., an optical fiber cable) and converts these light signals into corresponding electrical signals. An optical transmitter is a circuit that receives electrical signals and converts these electrical signals into corresponding light signals suitable for transmission across an optical medium, such as fiber optic cables. When a circuit includes both the functionality of an optical receiver and an optical transmitter, the circuit is commonly referred to as an optical transceiver.

An important component in a fiber optic module is the connector guide. The connector guide receives a connector through which light is sent or received. Industry standards specify the mechanical and electrical characteristics of the connector interface. The fiber optic module includes a pair of guide pins for mating with the connector. For the proper transmission of light across the connector to the module, the guide pins and the connector must be aligned. Consequently, an important manufacturing concern is the alignment of the guide pin to the connector.

During the manufacturing of the fiber optic module, there is a particular stage where the guide pins are aligned with the connector. The prior art method aligns the connector guide with the housing of the module. For example, a hard stop on the housing can specify the exact position of the connector guide (also referred to as a receptacle). The prior art method ensures that the receptacle is straight with respect to the housing (i.e., the receptacle is never over rotated or under-rotated with respect to the housing).

This prior art approach provides tolerable results when the guide pin holder is aligned or straight with respect to the housing. Unfortunately, the guide pin holder is not always straight with respect to the housing. When the guide pins are at an angle with respect to the housing, and the connector guide is straight relative to the housing, then the connector enters the module in a straight fashion. However, the connector does not align properly with the rotated guide pins. When the holes in the connector are not lined-up with the guide pins in the module, a proper connection cannot be made. This improper connection greatly increases the loss in the signal, which most often results in these parts being discarded.

Based on the foregoing, there remains a need for a method and apparatus for aligning guide pins with a connector guide that overcomes the disadvantages set forth previously.

SUMMARY OF THE INVENTION

One aspect of the present invention is the provision of a receptacle turner that aligns a receptacle with one or more guide pins instead of aligning the receptacle with a housing as is performed in the prior art.

According to one embodiment of the present invention, a method and apparatus for ensuring that two guide pins that are disposed in a module.(e.g., a fiber optic module) mate with two holes in a connector. A receptacle positioner is provided to position a connector guide in an aligned orientation with respect to the guide pins. When in the aligned orientation, the centerline of the connector guide is in alignment with the centerline of the two guide pins of the module, thereby ensuring that the two holes of the connector mate with the two guide pins when the connector is inserted into the connector guide.

According to another embodiment of the present invention, a connector guide positioner, which is a piece part employed to aid the assembly of modules (e.g., fiber optic modules), is provided. The main function of the connector guide positioner is to ensure that the connector guide is situated properly in the module with respect to guide pins. The connector guide guides the connector into the module, and the connector engages two guide pins that are disposed in the module. The connector guide positioner aligns the connector guide with the guide pins, thereby ensuring that the guide pins will be aligned with the connector when the connector is inserted into the module.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A method and apparatus for aligning guide pins with a connector guide are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Connector Guide Positioner 100

One aspect of the present invention is the provision of a connector guide positioner 100 (also referred to hereinafter as a receptacle turner), which is a piece part employed to aid the assembly of fiber optic modules (e.g., a 12 channel parallel fiber optic module). The main function of the connector guide positioner 100 is to ensure that the receptacle or connector guide is situated properly in the module.

The module includes ports to receive and/or transmit light signals. Connectors are employed to couple the module to light carrying medium (e.g., fiber optic cables). These connectors typically meet one or more industry standards, such as IEC Standard 1754-7, TIA/EIA 604-5 Type MPO, ANSI HIPPI 6400 standard, optical Internetworking Forum (OIF), Infiniband, and 10 GFC Fiber Channel. These standards typically specify the electrical and mechanical characteristics of the connector.

As described earlier, the connector guide or receptacle guides the connector into the module. For example, the inner portion of the receptacle is designed to match the outer portion of the connector so that the connector can be easily guided into the module.

Consequently, when the connector guide is situated correctly with respect to guide pins that engage the connector, there is proper alignment between the connector and the guide pins. Specifically, the connector guide positioner 100 aligns the connector guide or receptacle with one or more guide pins, thereby ensuring that the guide pins will be aligned with the connector when the connector is inserted into the module.

Figure 1:
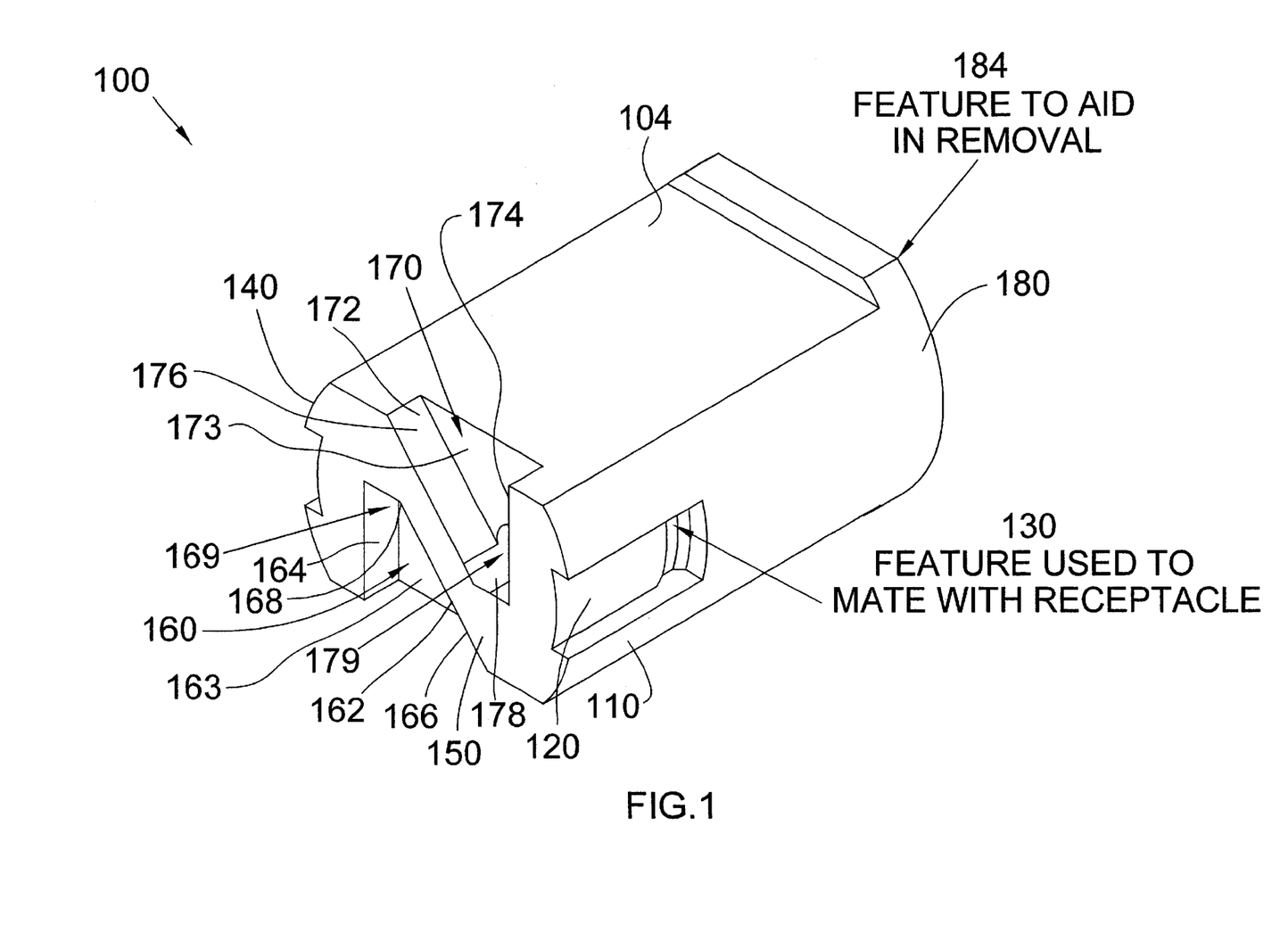
FIG. 1 illustrates a perspective view of a connector guide positioner according to one embodiment of the present invention.

FIG. 1 illustrates a perspective view of a connector guide positioner 100 according to one embodiment of the present invention. The connector guide positioner 100 (also referred to herein as simply "positioner") includes a body 104 for insertion into a connector guide, which is illustrated is FIGS. 2–4 and described in greater detail with reference thereto. The body 104 is preferably shaped to resemble the body of the connector so that there is a tight fit between the inner surface of the connector guide and the outer surface of the connector guide positioner 100.

A tight fit between the inner surface of the connector guide and the outer surface of the connector guide positioner 100 ensures that the horizontal displacement (e.g., displacement in the left and right directions along the x axis) and vertical displacement (e.g., displacement in the up and down directions along the y axis) of the connector guide positioner 100 with respect to the connector guide is not a concern.

The body 104 includes a pair of opposing side walls. Each side wall (e.g., side wall 100) defines a groove (e.g., groove 120) and a feature (e.g., feature 130) for mating with a portion of the connector guide. The feature 130 can be, for example, a detent for receiving a latch portion of the connector guide as described in greater detail hereinafter with reference to FIG. 4.

The positioner 100 also includes a removal portion 180 that defines a feature 184 to aid in the removal of the connector guide positioner 100 from the connector guide after the connector guide or receptacle has been aligned and properly attached in the optical module housing. The feature 184 can, for example, be a lip portion that extends substantially along one dimension of the removal portion 180.

The connector guide positioner 100 also includes a pin contact portion 140 that defines a first cutout 160 and a second cutout 170. The first cutout 160 and the second cutout 170 preferably have a triangular shape or profile. It is noted that the first cutout 160 and the second cutout 170 may have other shapes or profiles.

The first cutout 160 includes a first pin guiding surface 162 and a stop surface 164. The first pin guiding surface 162 guides a first guide pin from a first position 166 to a second position 168. The stop surface 164 prevents the first guide pin from moving further to the left in a horizontal direction. The movement of the first guide pin with respect to first pin guiding surface 162 is described in greater detail hereinafter with reference to FIG. 6. The first cutout 160 also includes a first slot 169, disposed proximal to the second position 168, for receiving the first guide pin.

The pin contact portion 140 also defines a second cutout 170 that may have a triangular shape or profile. The second cutout 170 includes a second pin guiding surface 172 and a stop surface 174. The second pin guiding surface 172 guides a second guide pin from a first position 176 to a second position 178. The stop surface 174 prevents the second guide pin from moving further to the right in a horizontal direction. The movement of the second guide pin with respect to second pin guiding surface 172 is described in greater detail hereinafter with reference to FIG. 6. The second cutout 170 also includes a second slot 179, disposed proximal to the second position 178, for receiving the second guide pin.

As shown, the first pin guiding surface 162 and second pin guiding surface 172 are preferably ramps that are substantially parallel to each other. The thickness of the connector guide positioner 100 is preferably selected to allow for minimal play between the connector guide and the connector guide positioner 100. The size of the slots 169, 179 is preferably selected to allow for minimal play between the guide pins and the connector guide positioner 100. It is important that the number of degrees of offset between the centerline of the connector guide and the centerline of the guide pins not exceed the maximum number of degrees that can be compensated by a ferrule float in the connector. In this example, the thickness of the positioner 100 and the size of the slots are selected sot that the number of degrees of offset between the centerline of the connector guide and the centerline of the guide pins is about 0.4 degrees or less.

Figure 2:
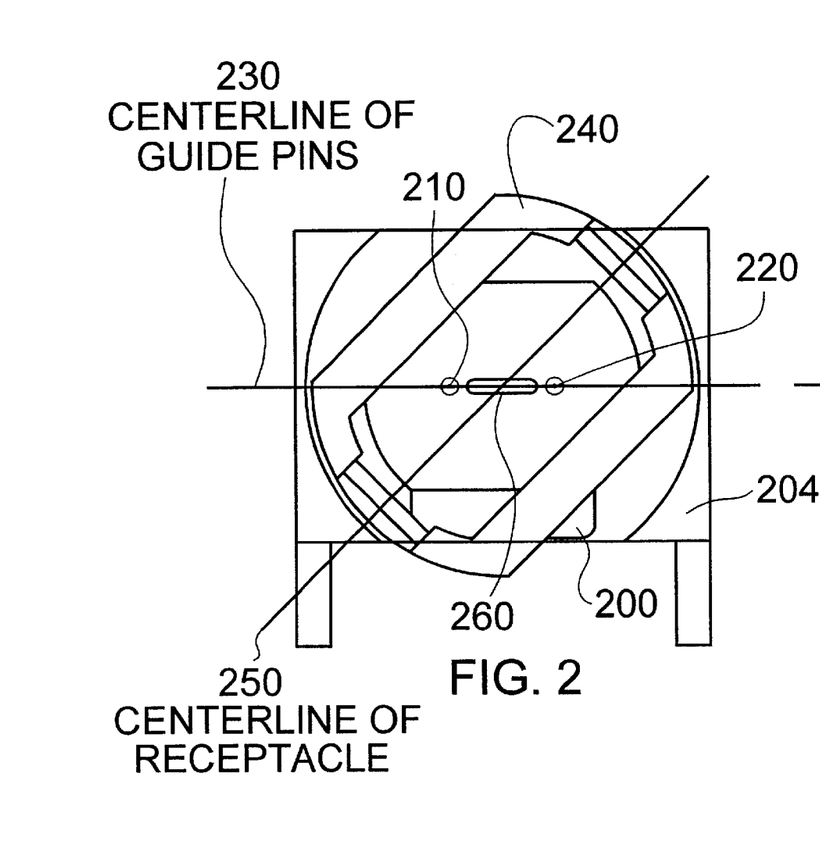
FIG. 2 illustrates the receptacle in a first position in the housing, where the centerline of the receptacle is not aligned with the centerline of the guide pins according to another embodiment of the present invention.

FIG. 2 illustrates the connector guide 240 (also referred to herein as the receptacle) in a non-aligned orientation with respect to the guide pins 210, 220. For example, the connector guide 240 can be inserted into the housing 204 of an optical module in a non-aligned orientation and then subsequently turned to an aligned orientation as shown in FIG. 3.

Referring to FIG. 2, a lens holder 200 is disposed in a housing 204 for the optical module. The lens holder 200 can be directly attached to one of the inner surfaces of the housing 204 or indirectly attached to one of the inner surfaces of the housing 204 through one or more parts (e.g., a printed circuit board).

The lens holder 200 includes a first guide pin 210 and a second guide pin 220. Centerline 230 passes through both the first guide pin 210 and the second guide pin 220. During manufacture of the optical module, a connector guide 240 is inserted into the housing 204 and oriented with respect to the guide pins 210 and 220. The alignment method of the present invention employs a positioner 100 to turn and orient the connector guide 240 so that the centerline 250 of the connector guide 240 is aligned with the centerline 230 of the guide pins 210 and 220. The lens holder 200 also defines an opening 260 for receiving a lens array. It is noted that the method of the present invention applies equally to other applications, in which the guide pins may extend from a part or piece that is different from the lens holder.

Figure 3:
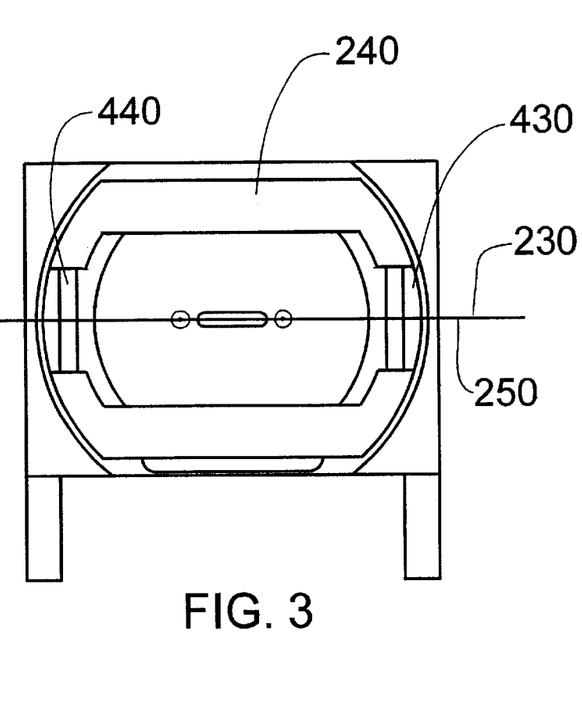
FIG. 3 illustrates the receptacle in a second position in the housing, where the centerline of the receptacle is aligned with the centerline of the guide pins according to one embodiment of the present invention after using the connector guide positioner.

FIG. 3 illustrates the receptacle in an aligned orientation with respect to the guide pins after using the connector guide positioner of the present invention. In the aligned orientation, it is noted that the centerline 250 of the connector guide 240 aligns with the centerline 230 of the guide pins 210 and 220.

Figure 4:
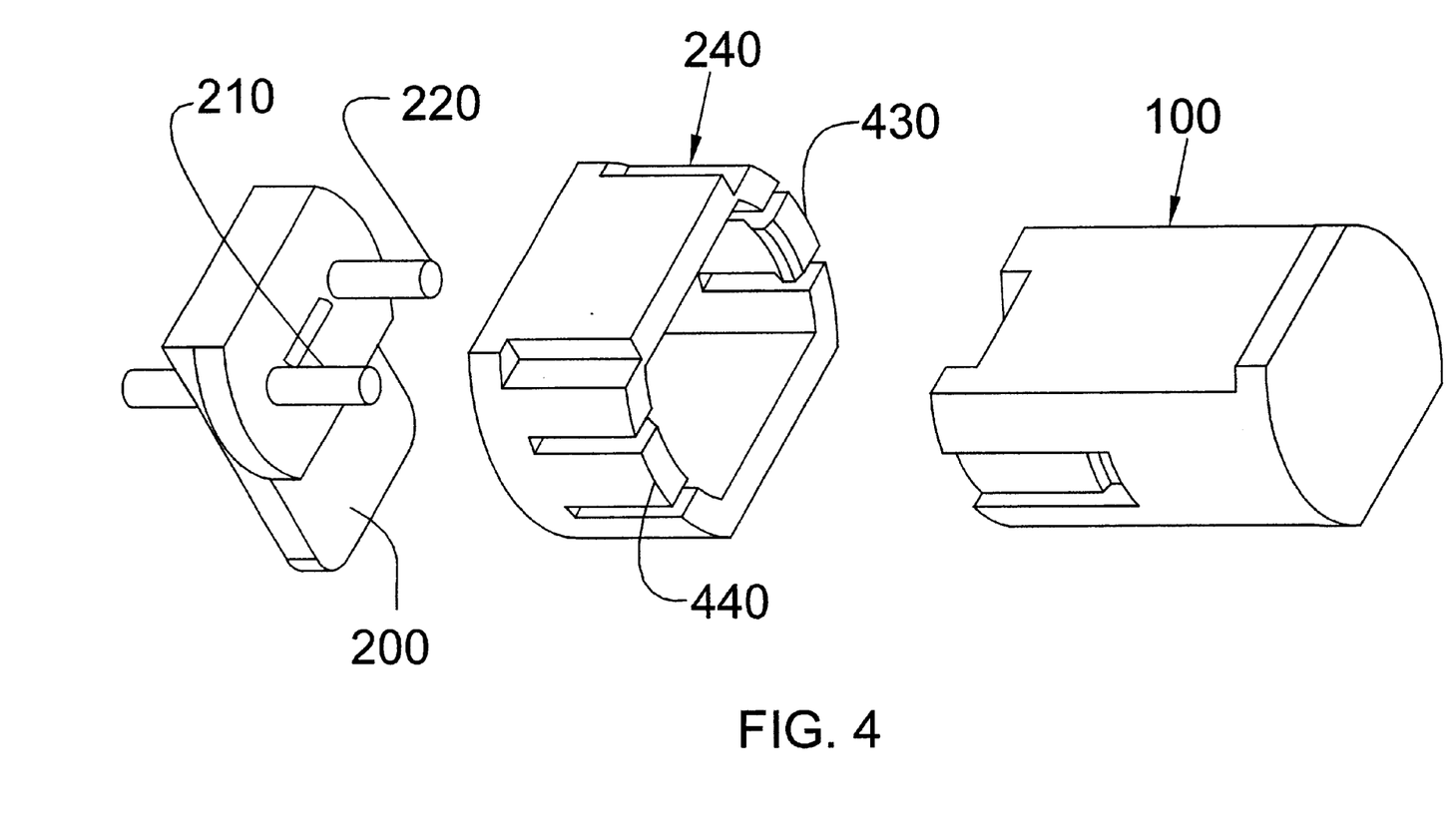
FIG. 4 illustrates an exploded view of the guide pin holder, the connector guide, and the connector guide positioner of the present invention.

FIG. 4 illustrates an exploded view of the guide pin holder 200, the connector guide 240, and the connector guide positioner 100 of the present invention. Referring to FIG. 4, the connector guide includes a first latch mechanism 430 and a second latch mechanism 440 for sliding in the grooves 120 and for engaging the feature 130 of the positioner 100. For example, the connector guide may include a pair of latches.

As described previously, the connector guide positioner 100 includes a pair of opposing walls that each defines a groove and bump (or detent). By inserting the guide pins into the respective slots, the latches of the connector guide are engaged to the respective detents of the connector guide positioner.

The vertical walls 163, 173 of the cut-outs 160, 170 contact the respective guide pins 210, 220 to prevent the lens holder 200 from being closer than a predetermined distance from the connector guide and positioner combination. This predetermined distance is maintained until the guide pins 210, 220 are positioned through the slots 169, 179, respectively. It is noted that the latching mechanism 430, 440 of the connector guide 240 is positioned to the left of the feature (e.g., feature 130) until the guide pins 210, 220 are inserted in the slots 169, 179. Once the guide pins 210, 220 are inserted into the slots 169, 179, the latching mechanism 430, 440 is positioned to the right of the feature 130 (e.g., a bump).

According to one embodiment of the present invention, a method is provided for aligning in a housing the centerline passing through two guide pins with a centerline of the connector guide by using a connector guide positioner. The positioner includes a first slot and a second slot.

Figure 5:
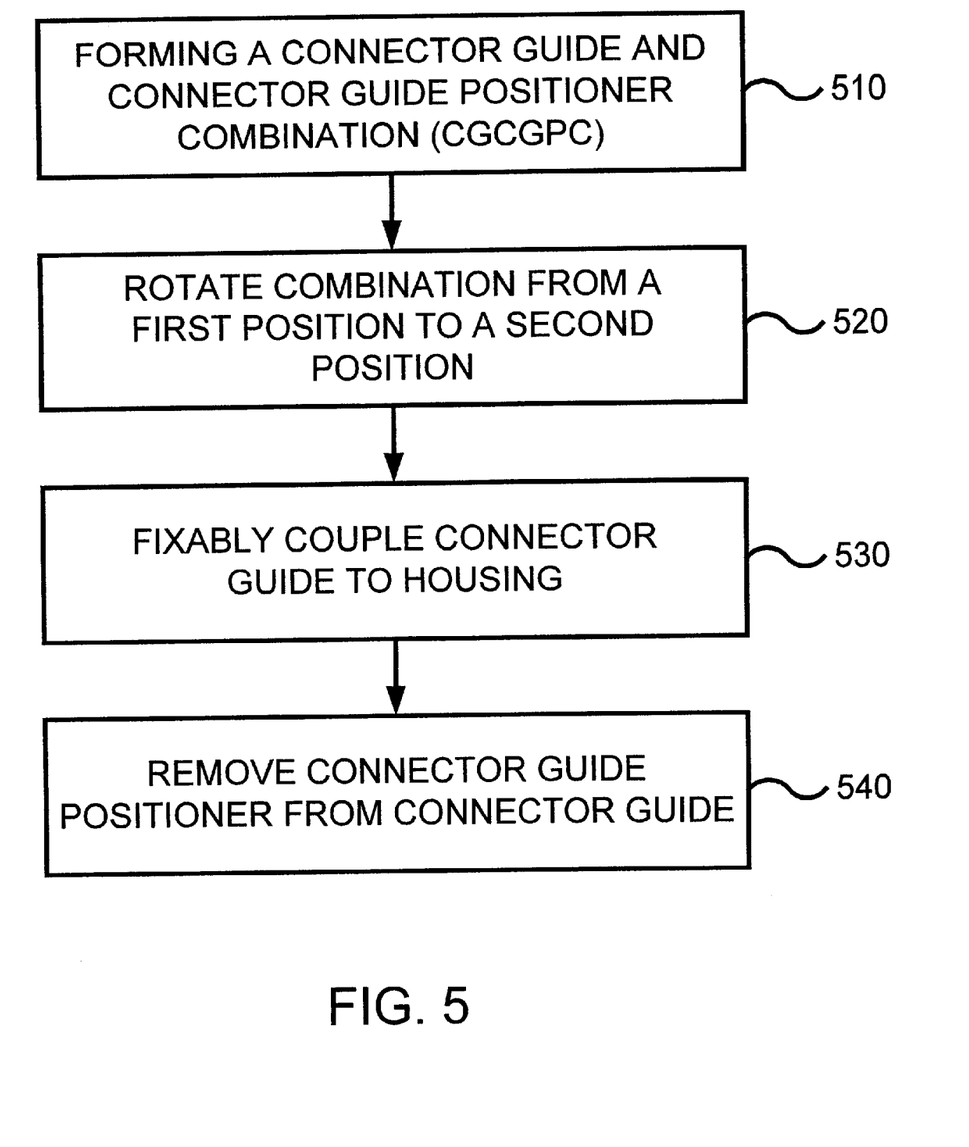
FIG. 5 is a flowchart illustrating the steps performed for aligning the connector guide with the guide pins according to one embodiment of the present invention.

FIG. 5 is a flowchart illustrating the steps performed for aligning the connector guide with the guide pins according to one embodiment of the present invention. In step 510, the connector guide positioner is coupled to the connector guide to form a connector guide and connector guide positioner combination. For example, the connector guide positioner can be inserted into the connector guide so that the latching mechanism of the connector guide 240 is disposed adjacent to the feature (e.g., a bump) but not in engagement therewith. The vertical walls of the cut-outs prevent further insertion of the positioner 100 into the connector guide 240 by contacting the guide pins 210, 220 until the guide pins 210, 220 reach the slots 169, 179, which is described in greater detail hereinafter, at which point the positioner can be further inserted into the connector guide 240. The step of coupling the connector guide positioner to the connector guide can include the sub-step of bringing the guide pins into contact with a respective pin guiding surface.

In step 520, the connector guide positioner and connector guide combination is rotated from a first position to a second position. In the second position, the centerline of the guide pins is aligned with the centerline of the connector guide. In this step, the combination may be rotated in such as manner as to guide a first guide pin from a first position to a second position along a first pin guiding surface, and the first guide pin may be inserted into a first slot. Simultaneously, as the combination is rotated, a second guide pin may be guided from a first position to a second position along a second pin guiding surface, and the second guide pin may be inserted into a second slot.

For example, the combination can be turned until the guide pins hit the stop walls 164, 174 of the cutouts. The positioner 100 may then be further inserted into the connector guide 240 to bring the latching mechanism into engagement with the features (e.g., detents) of the positioner 100. Specifically, when the guide pins 210, 220 reach the slots 169, 179, the positioner 100 can be fully inserted into the connector guide 240, and the latching mechanism can be engaged. It is noted that the latching mechanism securely holds the connector guide 240 in alignment with the guide pins 210, 220, for attachment with the housing 204 until disengaged by the user.

In step 530, the connector guide is fixably coupled to the housing to maintain the alignment between the guide pins and the connector guide. For example, an adhesive material, such as an epoxy, may be utilized to secure the connector guide to the housing. Preferably, the adhesive material is applied along a surface where the housing and receptacle come into contact, thereby bonding the housing and the receptacle together. This step fixes the position of the receptacle relative to the guide pins.

In step 540, the connector guide positioner is removed from the connector guide. This removal step can include disengaging the latch mechanism of the connector guide from the detent of the connector guide positioner. This step can also involve utilizing the feature 184 to aid in the removal of the connector guide positioner from the connector guide.

Figure 6:
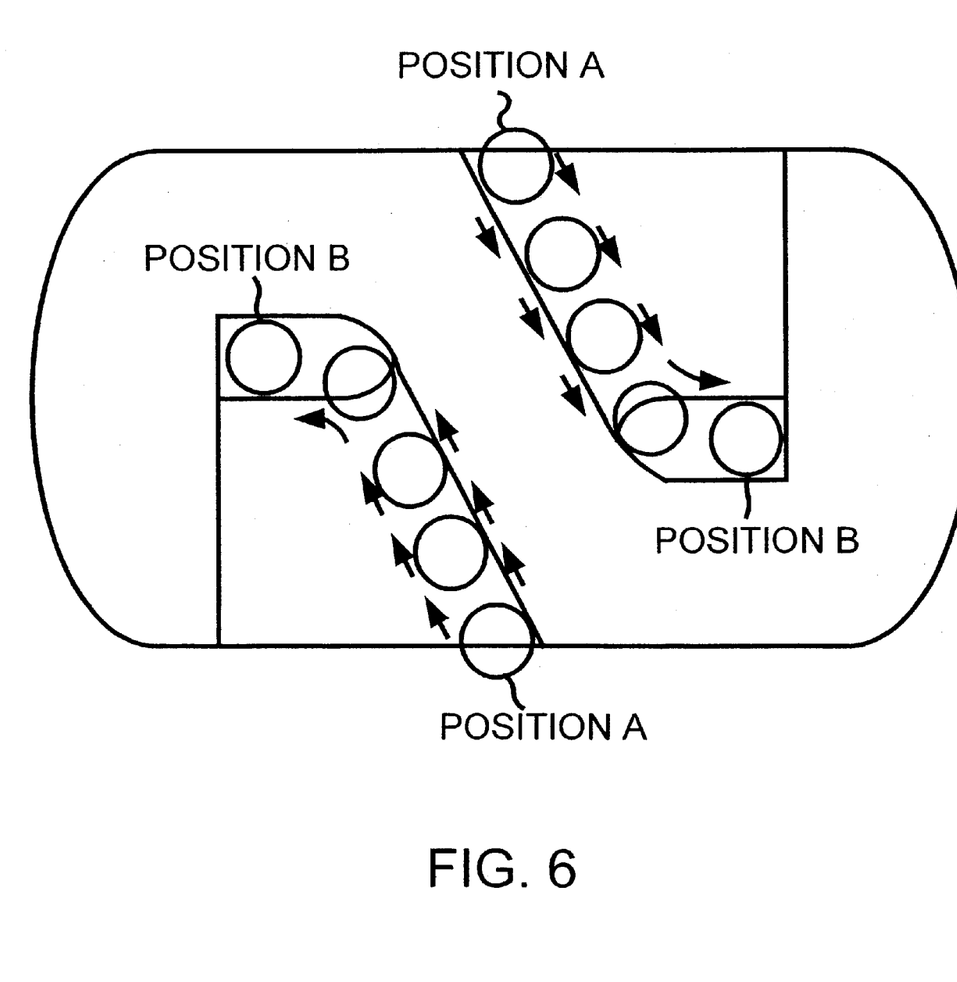
FIG. 6 illustrates the movement of the guide pins with respect to pin guiding surfaces of the connector guide positioner according to one embodiment of the present invention.

FIG. 6 illustrates the movement of the guide pins with respect to a surface of the connector guide positioner according to one embodiment of the present invention.

As described earlier, it is important that the fibers in the connector line up with the lens array in the module. The receptacle or connector guide in the module is provided to perform this alignment function. When the receptacle is over-rotated or under-rotated, the holes in the connector do not line up with the guide pins in the module. The receptacle positioner (or connector guide positioner) of the present invention ensures the receptacle is neither over-rotated nor under-rotated. Instead, the positioner of the present invention ensures that the centerline of the receptacle lines up with the centerline between the two guide pins, thereby ensuring that the holes in the connector line up with the guide pins in the module.

The alignment technique of the present invention can be applied to manufacture optical modules that can be utilized in a variety of applications. These applications include, but are not limited to, parallel optical interconnect between PC cards and patch panels, miniature interconnection for optical/electrical modules, optical switch interframe connections.

Compared to the prior art, the receptacle turner of the present invention has the important benefit of aligning the guide pins to the receptacle directly instead of indirectly through the housing or some other piece part. This direct alignment of the present invention ensures that the guide pins align with the connector even when the guide pins are rotated with respect to a housing or other feature within the fiber optic module.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A receptacle positioner for use in assembling a receptacle in a module that includes two guide pins with a centerline, the receptacle including a centerline, the receptacle positioner comprising:
   a) a body for removably coupling with the receptacle to form a receptacle positioner and receptacle combination; and
   b) a pin contact portion for use in aligning the centerline of the two guide pins with the centerline of the receptacle;
   wherein the receptacle positioner is employed to orient the receptacle with respect to the guide pins so that the centerline of the connector guide is aligned with the centerline of the guide pins.

2. The positioner of claim 1 wherein the receptacle further includes a latching mechanism; and wherein the body further includes
   a pair of opposing side walls;
   wherein each wall defines a detent for engaging the latching mechanism of the receptacle.

3. The positioner of claim 1 further comprising:
   a removal portion for use in de-coupling the positioner and the receptacle after alignment of the centerline of the receptacle with the centerline of the guide pins is achieved.

4. The positioner of claim 1 wherein the receptacle positioner further includes a wall for defining a first cut-out that includes a pin guiding surface for guiding a first guide pin from a first position to a second position and a slot for receiving the first guide pin proximal to the second position.

5. The positioner of claim 1 wherein the receptacle positioner further includes a wall for defining a second cut-out that includes a pin guiding surface for guiding a second guide pin from a first position to a second position and a slot for receiving the second guide pin proximal to the second position.

6. The positioner of claim 1 wherein the body further includes a feature for removably coupling with the receptacle to form a receptacle positioner and receptacle combination.

7. A method for assembling a receptacle in a module that includes two guides pins having a centerline, the receptacle including a centerline, the method comprising:
   employing a receptacle positioner to position the receptacle in a first orientation so that the centerline of the receptacle is in alignment with the centerline of the two guide pins of the module.

8. The method of claim 7 wherein employing said receptacle positioner to position said receptacle in a first orientation so that the receptacle is in alignment with the centerline of the two guide pins of the module includes:
   coupling said receptacle positioner with said receptacle to form a receptacle positioner and receptacle combination; and
   aligning the receptacle positioner and receptacle combination with respect to the guide pins.

9. The method of claim 8 wherein employing said receptacle positioner to position said receptacle in said first orientation so that the receptacle is in alignment with the centerline of the two guide pins of the module further includes:
   fixably coupling the receptacle to a housing to maintain the alignment between the guide pins and the receptacle.

10. A method for aligning two guide pins with a center line passing therethrough with a connector guide with a center line by using a connector guide positioner, the method comprising:
    a) coupling the connector guide to the connector guide positioner to form a connector guide and connector guide positioner combination; and
    b) rotating the connector guide and connector guide positioner combination with respect to the guide pins so that centerline of the guide pins is aligned with the centerline of the connector guide.

11. The method of claim 10 further comprising the steps of
    c) fixably coupling the connector guide to a housing to maintain the alignment between the guide pins and the connector guide.

12. The method of claim 11 further comprising the steps of
    d) de-coupling the connector guide positioner and the connector guide.

13. The method of claim 12 wherein the connector guide further includes a latch mechanism; wherein the connector guide positioner further includes a detent; and wherein the step of de-coupling the connector guide positioner and the connector guide includes disengaging the latch mechanism of the connector guide from the detent of the connector guide positioner.

14. The method of claim 11 wherein the connector guide positioner further includes a front wall for defining a lip for use in de-coupling the connector guide positioner and the connector guide after the step of fixably coupling the connector guide to a housing to maintain the alignment between the guide pins and the connector guide.

15. The method of claim 11 wherein the step of fixably coupling the connector guide to the housing to maintain the alignment between the guide pins and the connector guide includes
    using one of an adhesive material, glue, and epoxy to secure the connector guide to the housing.

16. The method of claim 10 wherein the connector guide includes a latch mechanism; and wherein the connector guide positioner includes a feature for mating with the latch mechanism;
    wherein the step of coupling the connector guide to the connector guide positioner to form a connector guide and connector guide positioner combination includes
    engaging the latch mechanism of the connector guide with the mating feature of the connector guide positioner.

17. The method of claim 16 wherein the latching mechanism includes a pair of latches; wherein the feature for mating with the latch mechanism includes a first side wall for defining a first detent and a second side wall for defining a second detent;

wherein the step of coupling the connector guide to the connector guide positioner to form a connector guide and connector guide positioner combination further comprises:

engaging the latches of the connector guide to the respective detents of the connector guide positioner.

18. The method of claim 10 wherein the connector guide positioner further includes a wall for defining a first cut-out that includes a pin guiding surface for guiding a first guide pin from a first position to a second position and a slot for receiving the first guide pin proximal to the second position.

19. The method of claim 10 wherein the connector guide positioner includes a first pin guiding surface and a second pin guiding surface;

wherein the step of coupling the connector guide to the connector guide positioner to form said connector guide and connector guide positioner combination includes   bringing the guide pins into contact with a respective pin guiding surface.

20. The method of claim 10 wherein the connector guide positioner further includes a wall for defining a second cut-out that includes a pin guiding surface for guiding a second guide pin from a first position to a second position and a slot for receiving the second guide pin proximal to the second position.

* * * * *